US007955721B2

(12) United States Patent
Smith et al.

(10) Patent No.: US 7,955,721 B2
(45) Date of Patent: Jun. 7, 2011

(54) ARTICLE HAVING COBALT-PHOSPHOROUS COATING AND METHOD FOR HEAT TREATING

(75) Inventors: Blair A. Smith, South Windsor, CT (US); Aaron T. Nardi, East Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 165 days.

(21) Appl. No.: 12/015,089

(22) Filed: Jan. 16, 2008

(65) Prior Publication Data

US 2009/0178736 A1 Jul. 16, 2009

(51) Int. Cl.
*B32B 15/00* (2006.01)
*C22C 19/07* (2006.01)

(52) U.S. Cl. ........ 428/698; 428/668; 428/689; 428/699; 75/255

(58) Field of Classification Search ........................ None
See application file for complete search history.

(56) References Cited

U.S. PATENT DOCUMENTS 2,159,805 A * 5/1939 Lenz et al. .................... 313/317
2,200,743 A * 5/1940 Hardy ........................... 148/240
2,643,221 A 6/1953 Brenner et al.
3,490,314 A 1/1970 Calnan
3,753,667 A 8/1973 Metzger et al.
4,153,453 A * 5/1979 Hart et al. ....................... 420/94
4,366,034 A 12/1982 Ricks
4,441,857 A 4/1984 Jackson
4,673,468 A 6/1987 Myers
4,802,828 A 2/1989 Rutz
4,943,485 A 7/1990 Allam
4,950,375 A 8/1990 Leger
5,306,120 A 4/1994 Hammer
5,316,650 A * 5/1994 Ratzker et al. .................. 205/67
5,358,547 A * 10/1994 Holko ............................. 75/254
5,601,933 A 2/1997 Hajmrle
5,649,994 A * 7/1997 Holko ............................. 75/255
5,847,650 A 12/1998 Zhou
5,881,972 A 3/1999 Smith
5,908,285 A 6/1999 Graff
5,966,585 A * 10/1999 Sue ............................... 428/555
6,037,004 A 3/2000 Zajchowski (Continued)

FOREIGN PATENT DOCUMENTS

EP 1813697 8/2007

(Continued)

OTHER PUBLICATIONS

U.S. Patent Application "Low Cost, Environmentally Favorable, Chromium Plate Replacement Coating for Improved Wear Performance", U.S. Appl. No. 11/653,525, filed on Jan. 16, 2007.
European Search Report Dated Jun. 2, 2009.

*Primary Examiner* — Aaron Ausitn
(74) *Attorney, Agent, or Firm* — Carlson, Gaskey & Olds, P.C.

(57) ABSTRACT

A method of processing an article having a substrate and a cobalt-phosphorous coating disposed on the substrate includes heat treating the article. At least one physical characteristic of the cobalt-phosphorous coating is altered using the heat treating to thereby change a performance characteristic of the article. For example, the article may be an actuator component having a bore or a shaft that is movably disposed at least partially within the bore.

10 Claims, 2 Drawing Sheets

U.S. PATENT DOCUMENTS

| | | | | |
|---|---|---|---|---|
| 6,067,784 | A * | 5/2000 | Jordan | 56/102 |
| 6,341,747 | B1 | 1/2002 | Schmidt | |
| 2006/0040126 | A1 | 2/2006 | Richardson | |
| 2006/0180884 | A1 * | 8/2006 | Ng et al. | 257/421 |

FOREIGN PATENT DOCUMENTS

| | | | |
|---|---|---|---|
| JP | 63282295 | A * | 11/1988 |
| WO | WO 2004001100 | A1 * | 12/2003 |
| WO | 2007087050 | | 8/2007 |

* cited by examiner

ARTICLE HAVING COBALT-PHOSPHOROUS COATING AND METHOD FOR HEAT TREATING

BACKGROUND OF THE INVENTION

This disclosure relates to protective coatings and, more particularly, to a protective coating having cobalt and phosphorous for providing wear resistance.

A wide variety of different types of components are typically used under conditions that cause wear. In this regard, some components utilize protective coatings to limit wear over a desired lifetime of the component. For example, chromium plating has been used as a protective coating. However, due to restrictions on the use of chromium, there is a need for alternative types of coatings that do not utilize chromium. Although non-chromium coatings may be available, there is a continuing challenge of finding non-chromium coatings and processing methods that provide similar performance to chromium coatings.

SUMMARY OF THE INVENTION

The disclosed example cobalt-phosphorous coatings are intended as a replacement for chromium coatings and the examples herein facilitate providing cobalt-phosphorous coatings with physical characteristics that meet desired design requirements and may meet or exceed the capability of chromium coatings.

For example, a method of processing an article having a cobalt-phosphorous coating includes heating the article with the cobalt-phosphorous coating disposed on a substrate of the article, and altering at least one physical characteristic of the cobalt-phosphorous coating using the heat treating to thereby change a performance characteristic of the article. For example, the heat treating is used to modify a hardness of the cobalt-phosphorous coating, a bonding strength of the cobalt-phosphorous coating to the substrate, or both. Modifying the hardness or the bonding strength can improve the wear resistance of the article, for example.

The method may be used on any article, such as an actuator, that includes the cobalt-phosphorous coating. For example, the cobalt-phosphorous coating may be disposed on a bore of an actuator body and/or a shaft that is movably disposed at least partially within the bore.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
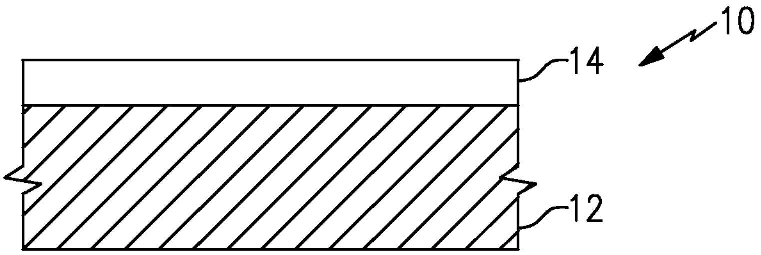
FIG. 1 illustrates an example article having a cobalt-phosphorous coating.

FIG. 1 schematically illustrates selected portions of an example article 10, which represents any type of article that would benefit from the examples disclosed herein. In this example, the article 10 includes a substrate 12 and a cobalt-phosphorous coating 14 disposed on the substrate 12. Generally, the substrate 12 is exposed to a relatively harsh environment that causes wear of the substrate 12. In this regard, the cobalt-phosphorous coating 14 protects the substrate 12 from wear, erosion, or the like.

The substrate 12 may include any type of material that is suitable for use in the article 10. For example, the substrate 12 includes titanium (e.g., a titanium alloy). However, it is to be understood that in other examples, other types of metals, metal alloys, or other materials may alternatively be used.

The cobalt-phosphorous coating 14 may be deposited onto the substrate 12 using any suitable technique. One non-limiting example of a technique is disclosed in co-pending application Ser. No. 11/653,525. However, it is to be understood that other techniques may alternatively be used.

The cobalt-phosphorous coating 14 may essentially include only cobalt and phosphorous. Other elements may be included as impurities that do not affect the properties of the cobalt-phosphorous coating 14, with the understanding that such elements may be unmeasured or undetectable in the cobalt-phosphorous coating 14. The cobalt-phosphorous coating 14 may include a greater amount of cobalt than phosphorous. That is, the cobalt-phosphorous coating 14 is a cobalt alloy. In a further example, the cobalt-phosphorous coating 14 nominally includes about 4 wt %-9 wt % of phosphorous with the remaining amount being cobalt. In a further example, the cobalt-phosphorous coating 14 nominally includes an amount of phosphorous that is greater than 6 wt % and less than or equal to 9 wt %, with the remaining amount being cobalt. An amount of phosphorous that is greater than 6 wt % and less than or equal to 9 wt % may facilitate reducing internal stresses during processing and thereby provide a degree of resistance to cracking. The term "about" as used in this description relative to compositions or other values refers to possible variation in the given value, such as normally accepted variations or tolerances in the art.

Figure 2:
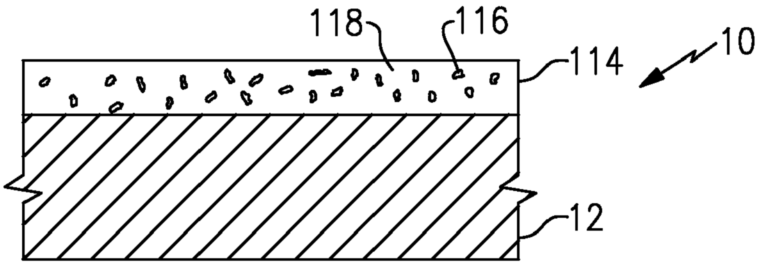
FIG. 2 illustrates another example article having a cobalt-phosphorous coating with hard particles.

FIG. 2 illustrates another example article 100, where like components are represented by like reference numerals. In this example, the article 100 also includes the substrate 12, but the cobalt-phosphorous coating 114 is used instead of the cobalt-phosphorous coating 14 of the previous example. The cobalt-phosphorous coating 114 is somewhat similar to the cobalt-phosphorous coating 14 of the previous example, except that the cobalt-phosphorous coating 114 includes hard particles 116 dispersed within a matrix 118 of cobalt and phosphorous. The hard particles 116 are harder than the matrix 118. Therefore, the hard particles 116 may increase an overall hardness of the cobalt-phosphorous coating 114.

The matrix 118 may have any of the compositions described above for the cobalt-phosphorous coating 14. That is, the matrix 118 may include 4 wt %-9 wt % phosphorous, or an amount greater than 6 wt % and less than or equal to 9 wt %. Alternatively, the amount of phosphorous relative to the total weight of the cobalt-phosphorous coating 114 may be 4 wt %-9 wt %, or an amount greater than 6 wt % and less than or equal to 9 wt %.

The hard particles 116 may be any suitable type of carbide for achieving desired physical characteristics of the cobalt-phosphorous coating 114. For example, the hard particles 116 include chrome carbide ($Cr_3C_2$), silicon carbide (SiC), or both. Similar to the cobalt-phosphorous coating 14 of the previous example, the cobalt-phosphorous coating 114 of this example may also be deposited using the technique disclosed in co-pending application Ser. No. 11/653,525. However, it is to be understood that other deposition methods may also be used.

Figure 3:
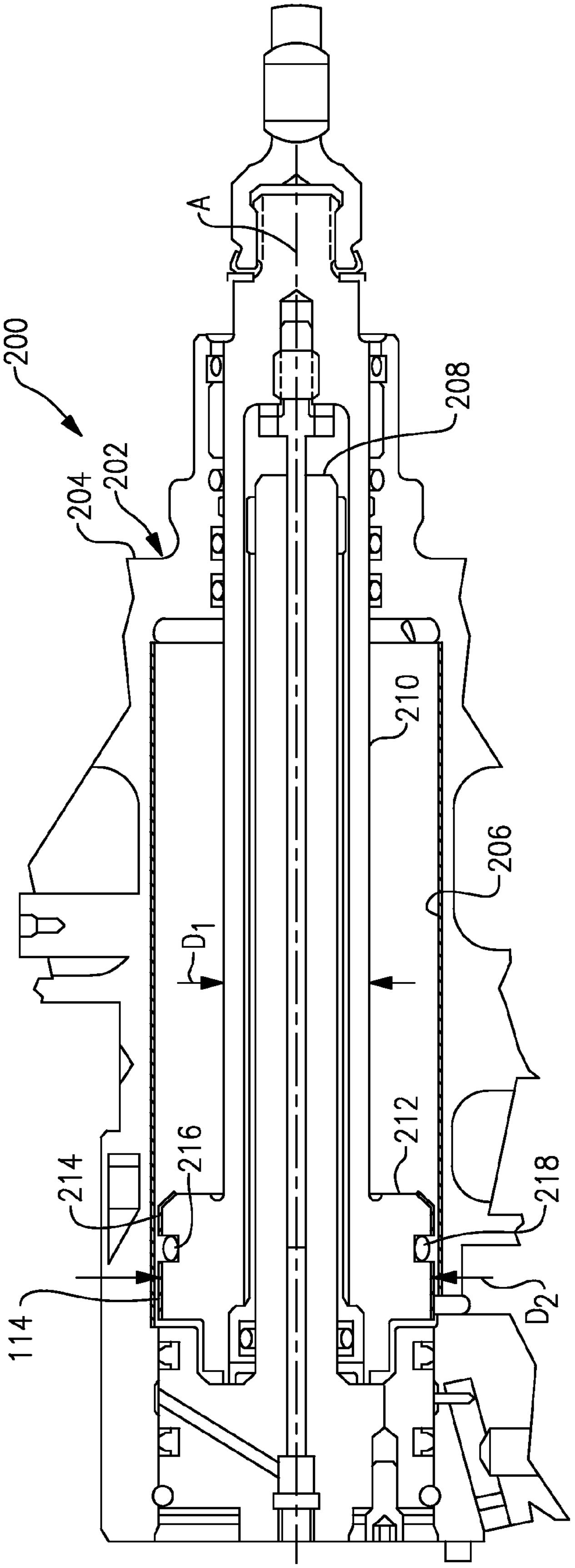
FIG. 3 illustrates another example article that includes an actuator.

FIG. 3 illustrates another example article 200 that includes an actuator 202. In this example, the actuator 202 includes an actuator body 204 having a central bore 206 that receives an actuator shaft 208. The actuator shaft 208 is generally movable within the bore 206 along an axially direction relative to axis A of the bore 206.

The actuator shaft 208 includes a shaft section 210 having a diameter $D_1$ and a piston section 212 having a diameter $D_2$ that is greater than the diameter $D_1$.

The piston section 212 includes an outer surface 214 having a recess 216 for o-ring 218, which provides a seal between the piston section 212 and the bore 206.

In operation, movement of the shaft 208 within the bore 206 (e.g., using pneumatic, hydraulic, electrical, or magnetic energy) causes the outer surface 214 of the piston section 212 to slide in frictional contact with the surface of the bore 206. In this regard, the bore 206, the outer surface 214 of the piston section 212, or both may be provided with the cobalt-phosphorous coating 114 (or 14) of the previous examples to limit wear of the actuator 202 and maintain sealing between the piston section 214 and the bore 206. Maintaining a seal between the piston section 212 and the bore 206 facilitates efficient movement of the shaft 208 without pneumatic or hydraulic fluid escaping around the piston section 212, for example. It is to be understood that although only the cobalt-phosphorous coating 114 is shown in this example, the actuator 202 may alternatively include the cobalt-phosphorous coating 14.

The cobalt-phosphorous coatings 14 and 114 are relatively hard compared to the substrate 12. The hardness may depend upon the particular composition of the cobalt-phosphorous coating 14 or 114, but is greater than about 500 HV. In some examples, the initial hardness of as-plated cobalt-phosphorous coating 14 is about 633 HV. The initial as-plated hardnesses of the cobalt-phosphorous coating 114 with chromium carbide or with silicon carbide is about 615-641 HV and 540-559 HV, respectively.

Although the articles 10, 100, and 200 may exhibit a desired level of performance from utilizing as-plated cobalt-phosphorous coating 14 or 114, it may also be desirable to improve the performance. To achieve an improvement, one or more physical characteristics the cobalt phosphorous coating 14 or 114 may be altered to thereby improve a performance characteristic of the article 10, 100, or 200. For example, the wear resistance of any of the articles 10, 100, 200 may correspond to the hardness of the cobalt-phosphorous coating 14 or 114 and/or to a bonding strength between the cobalt-phosphorous coating 14 or 114 and the substrate 12, for example. Thus, by altering the physical characteristic of the cobalt-phosphorous coating 14 or 114, such as the hardness or the bonding strength, the performance characteristic of the article 10, 100, or 200 can be altered.

Figure 4:
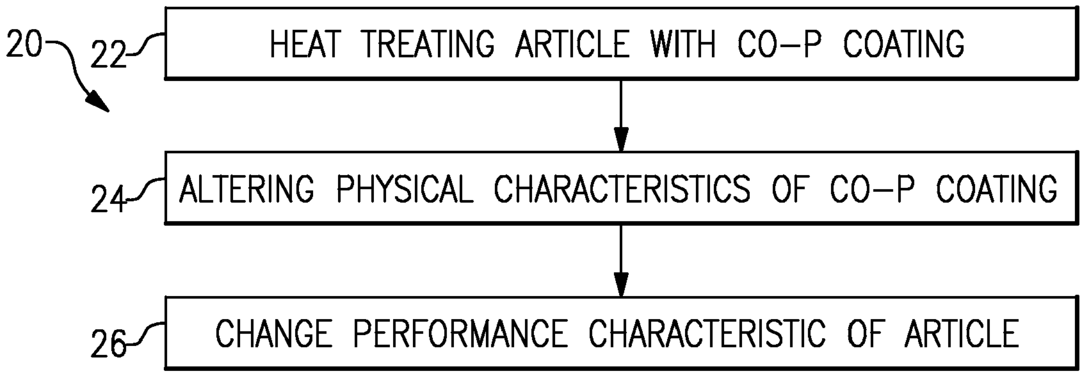
FIG. 4 illustrates an example method for processing an article having a cobalt-phosphorous coating.

FIG. 4 illustrates one example method 20 for processing any of the articles 10, 100, or 200 to improve a performance characteristic of the article 10, 100 or 200. For example, the method 20 includes heat treating 22 the article 10, 100, or 200 with the cobalt-phosphorous coating 14 or 114. At action 24, the heat treating 22 is used to alter at least one physical characteristic of the cobalt-phosphorous coating 14 or 114 and thereby change a performance characteristic of the article 10, 100, or 200, as represented at action 26.

The heat treating 22 may be used to alter any of a variety of different physical characteristics of the cobalt-phosphorous coating 14 or 114. For example, the heat treating may be used to alter the hardness, the bonding strength, or both of the cobalt-phosphorous coating 14 or 114.

In one example, the heat treating is used to increase the hardness of the cobalt-phosphorous coating 14 or 114. Initially, in an as-plated condition, the cobalt-phosphorous coating 14 or 114 may include a hardness as indicated above. The article 10, 100, or 200 having the cobalt-phosphorous coating 14 or 114 is then subjected to the heat treating 22 at a predetermined temperature for a predetermined amount of time to alter the cobalt-phosphorous coating 14 or 114 and thereby increase the hardness.

The heat treating 22 may be conducted at a heat treating temperature between about 420° F. (216° C.) and 765° F. (407° C.), depending upon the magnitude of the increase in hardness that is desired. For example, a temperature closer to the upper end of the given range may be used for a larger increase in hardness. In a few further examples, the heat treating temperature is selected to be about 750±15° F. (399±10° C.), 600±15° F. (316±10° C.), 550±15° F. (288±10° C.), or 435±15° F. (224±10° C.). These temperatures were developed using differential scanning calorimeter data. Given this description, one of ordinary skill in the art will be able to determine other temperatures for specific compositions of the cobalt phosphorous coating 14 or 114 and hard particles 116 using a similar technique.

Table 1 below indicates hardness for different types of the cobalt-phosphorous coatings 14 or 114 heat treated at the given temperatures. However, it is to be understood that actual results may vary.

| | Hardness, HV; 200 g load | | | | |
|---|---|---|---|---|---|
| Coating | As-Plated | 435° F. | 550° F. | 600° F. | 750° F. |
| Co—P | 633 | 615-641 | — | 936-951 | 891-908 |
| Co—P + $Cr_3C_2$ | 615-641 | 612-652 | 849-865 | — | 966-1010 |
| Co—P + SiC | 540-559 | 654-660 | 821-882 | — | 833-857 |

The heat treating 22 may alter a microstructure of the cobalt-phosphorous coating 14 or 114 to thereby achieve the increase in hardness. Additionally, the predetermined temperature used for the heat treating 22 may be selected to be below a critical temperature of the material that is selected for the substrate 12. For example, the predetermined temperature does not substantially affect the microstructure of the metal used for the substrate 12. Thus, the heat treating 22 may be used to increase the hardness of the cobalt-phosphorous coating 14 or 114 without significantly changing the physical properties of the substrate 12.

Alternatively, the heat treating 22 may be used to alter the bonding strength of the cobalt-phosphorous coating 14 or 114 to the substrate 12 while maintaining the initial as-plated hardness of the cobalt-phosphorous coating 14 or 114. That is, using a relatively low predetermined temperature within the given range for the heat treating 22 may not alter the hardness but may increase the bonding strength. For example, heat treating at a predetermined temperature of about 435° F.±15° F. for about 90 minutes is used to increase the bonding strength while maintaining the initial as-plated hardness. As such, the wear resistance of the article 10, 100, or 200 may be altered by improving the bonding strength rather than by increasing the hardness, which may facilitate limiting spalling of the cobalt-phosphorous coating 14 or 114.

Although a combination of features is shown in the illustrated examples, not all of them need to be combined to realize the benefits of various embodiments of this disclosure.

In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite article comprising:

a substrate; and a cobalt-phosphorous coating disposed on the substrate, the cobalt-phosphorous coating having a hardness that is greater than 500 HV wherein said cobalt-phosphorous coating comprises about 4 wt %-9 wt % of phosphorous and about 91 wt % to 96 wt % cobalt.

2. The composite article as recited in claim 1, wherein the hardness of the cobalt-phosphorous coating is greater than about 800 HV.

3. The composite article as recited in claim 1, wherein the hardness of the cobalt-phosphorous coating is about 800 HV-1010 HV.

4. The composite article as recited in claim 1, wherein the cobalt-phosphorous coating comprises an amount of phosphorous that is greater than 6 wt % and less than or equal to 9 wt %.

5. The composite article as recited in claim 1, wherein the cobalt-phosphorous coating comprises hard particles dispersed within a cobalt-phosphorous matrix.

6. The composite article as recited in claim 5, wherein the hard particles comprise at least one of chromium carbide or silicon carbide.

7. The composite article as recited in claim 1, wherein the substrate comprises titanium.

8. The composite article as recited in claim 1, wherein the substrate and the cobalt-phosphorous are formed in a shape of an actuator component.

9. A composite article consisting of:

a substrate; and a cobalt-phosphorous coating disposed on the substrate, the cobalt-phosphorous coating having a hardness that is greater than 500 HV.

10. The composite article of claim 9 wherein said cobalt-phosphorous coating is about 4 wt %-9 wt % of phosphorous and about 91 wt % to 96 wt % cobalt.

* * * * *